United States Patent [19]

Byrne et al.

[11] 4,322,949
[45] Apr. 6, 1982

[54] HYDRAULIC ASSIST TURBOCHARGER SYSTEM

[75] Inventors: Joe L. Byrne, Torrance; Robert J. Kobayashi, Rancho Palso Verdes; James H. Nancarrow, Torrance, all of Calif.

[73] Assignee: The Garrett Corporation, Los Angeles, Calif.

[21] Appl. No.: 153,566

[22] Filed: May 27, 1980

Related U.S. Application Data

[63] Continuation-in-part of Ser. No. 57,790, Jul. 16, 1979, Pat. No. 4,285,200.

[51] Int. Cl.³ .............................................. F02B 37/10
[52] U.S. Cl. ................................. 60/606; 60/39.14 M; 60/607
[58] Field of Search .......... 60/606, 607, 608, 39.14 M

[56] References Cited

U.S. PATENT DOCUMENTS

| | | | |
|---|---|---|---|
| 2,968,914 | 1/1961 | Birmann | 60/608 |
| 3,389,554 | 6/1968 | Wolf | 60/608 |
| 3,473,322 | 10/1969 | Wolf | 60/607 |
| 3,475,907 | 11/1969 | Kellett | 60/39.14 M X |
| 3,676,999 | 7/1972 | Oldfield | 60/606 |
| 3,869,866 | 3/1975 | Timoney | 60/607 |
| 3,927,530 | 12/1975 | Braun | 60/607 |
| 4,083,188 | 4/1978 | Kumm | 60/608 X |

FOREIGN PATENT DOCUMENTS 488396 7/1938 United Kingdom ................. 60/607

*Primary Examiner*—Michael Koczo, Jr.
*Attorney, Agent, or Firm*—Stuart O. Lowry; Albert J. Miller

[57] ABSTRACT

A turbocharger system for supplying charge air to a combustion engine includes a nonventilated hydraulic turbine mounted directly on the turbocharger shaft, and an auxiliary combustor mounted in-line between the engine and the turbocharger. The nonventilated hydraulic turbine is selectively driven by a high pressure hydraulic fluid to drive the turbocharger for supplying air to the auxiliary combustor, which in turn supplementally drives the turbocharger throughout a broad range of engine operation to provide additional air flow to the engine when required.

31 Claims, 10 Drawing Figures

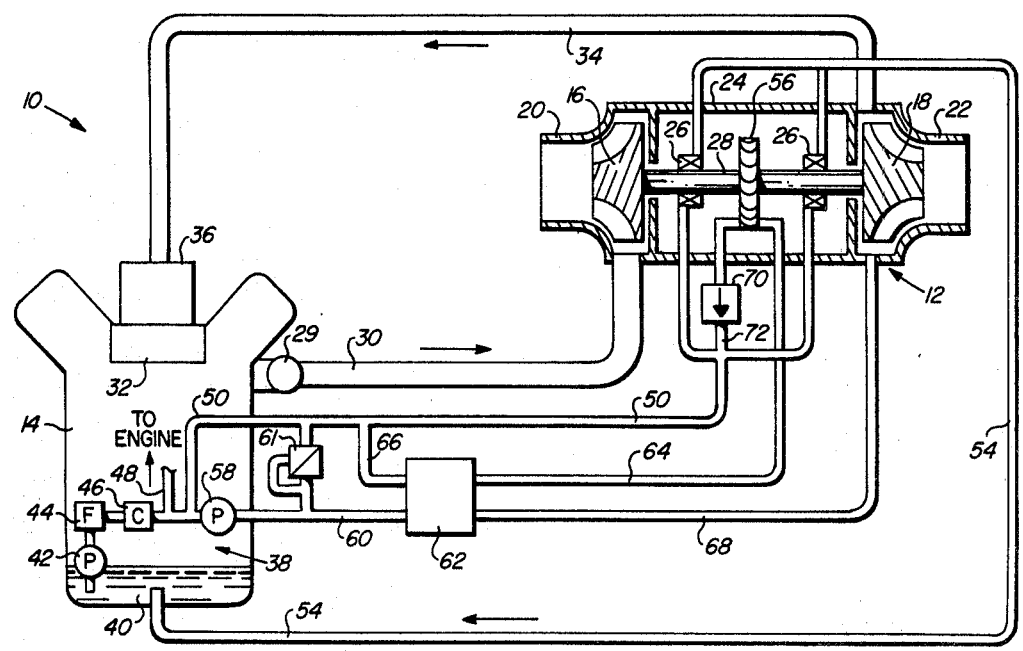

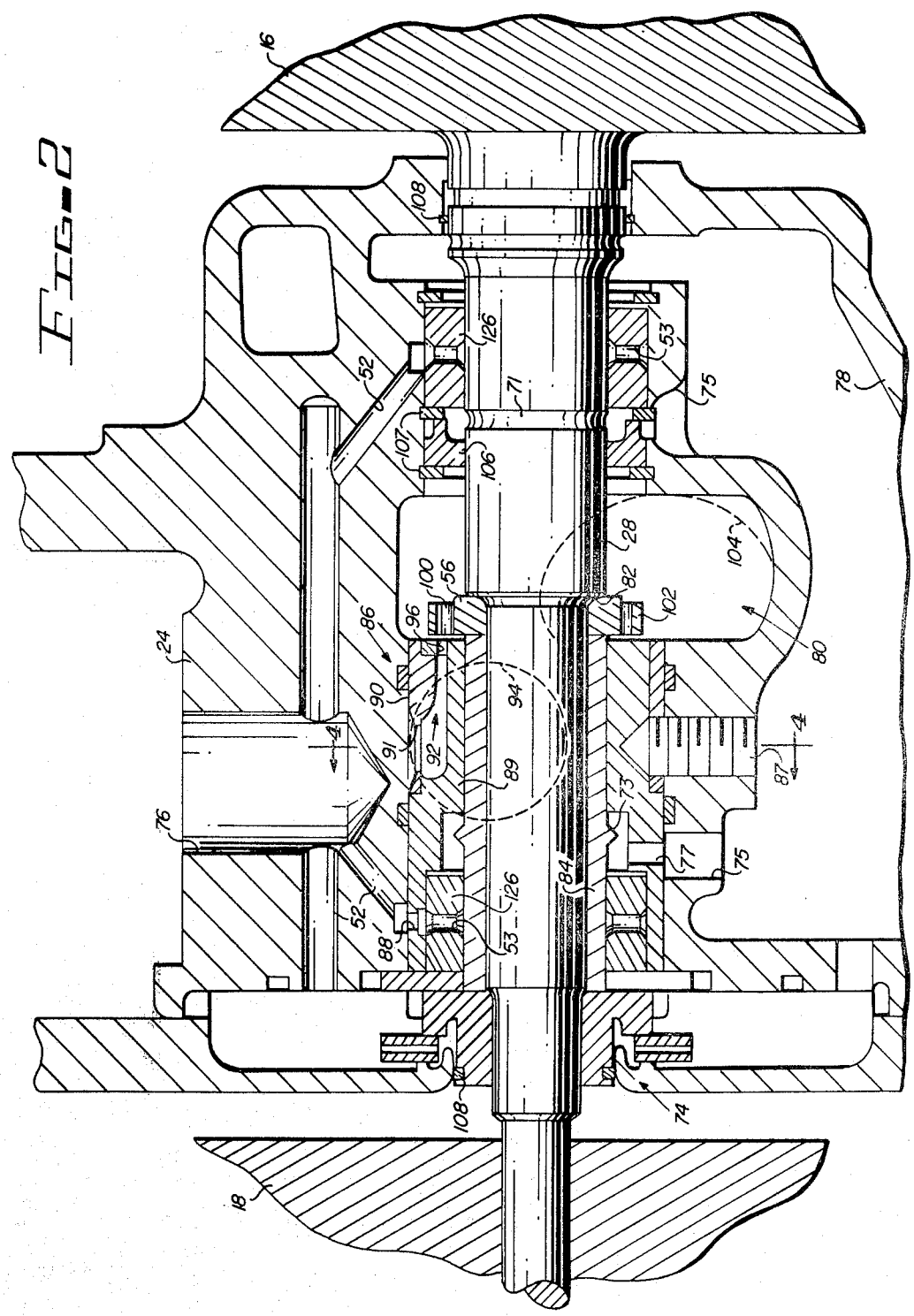

4,322,949

HYDRAULIC ASSIST TURBOCHARGER SYSTEM

BACKGROUND OF THE INVENTION

This application is a continuation-in-part of copending application Ser. No. 057,790, filed July 16, 1979, in the name of J. L. Byrne et al, now U.S. Pat. No. 4,285,200.

This invention relates to turbocharger systems for use with combustion engines. More specifically, this invention relates to a turbocharger system including hydraulic assist apparatus and method for supplementally driving the turbocharger at predetermined engine operating conditions.

Turbochargers and turbocharger systems are well kown in the art, and typically comprise a turbine wheel and a compressor wheel mounted on a common shaft. The turbine wheel and the compressor wheel are mounted within isolated turbine and compressor housings, which in turn are mounted on a so-called center housing including shaft bearings and lubricant circulation passages. The turbine housing includes a gas inlet and a gas outlet, and is coupled to a combustion engine for passage of engine exhaust gases for rotatably driving the turbine wheel. The rotating turbine wheel correspondingly drives the compressor wheel which compresses ambient air and supplies the compressed air, commonly referred to as charge air, to the engine.

Turbocharged engines are highly advantageous when compared with conventional naturally aspirated engines in that substantially denser air is delivered to the combustion chamber or cylinders of the engine. This increased air density results in an increased mass flow of available air for combustion to enable the engine to operate at substantially higher performance levels and with greater efficiency. However, an inherent limitation with turbochargers has been their inability to provide to the engine sufficient charge air during some conditions of engine operation. For example, charge air supplied to the engine by the turbocharger during low speed, full load conditions, or during low speed acceleration conditions typically is insufficient to maintain desired engine performance levels. This inadequate flow of charge air is caused by a relatively low available energy level of engine exhaust gases to drive the turbocharger turbine wheel which in turn drives the turbocharger compressor wheel.

A variety of system concepts are known in the prior art for boosting or supplementing the normal charge air output of a turbocharger during certain engine operating conditions. Some of these concepts relate to auxiliary combustion systems for controllably supplementing the energy level of the exhaust gases with additional combustion energy to supplement driving of the turbocharger. See U.S. Pat. No. 3,988,894 for one example of this type of system. Other system concepts include multiple turbocharger turbine and/or compressor components coupled together, such as those shown by U.S. Pat. Nos. 2,173,595; 2,898,731; 3,005,306; 3,498,052; and 3,335,877. Turbocharger arrangements with supplemental mechanical drives are shown by U.S. Pat. Nos. 2,386,096; 2,578,028; 2,585,029; and 2,585,968; whereas supplemental hydraulic drives are disclosed by U.S. Pat. Nos. 3,389,554; 3,473,322; 3,921,403; 3,927,530; and 4,083,198. While all of these various system concepts provide at least some supplemental driving of a turbocharger, the relative expense and complexity of these systems has provided a significant obstacle to commercial application. Moreover, mechanically driven and hydraulic motor-driven systems include inherent maximum speed limitations which prevent their use with modern turbochargers including high speed components designed for rotational speeds on the order of about 100,000 R.P.M. or more.

Some prior art system concepts include hydraulic turbines for driving a centrifugal compressor to supply charge air to an engine. In some designs, the hydraulic turbine is embodied in a supercharger system, as in U.S. Pat. No. 3,036,563. In other designs, the system proposes an hydraulic turbine for supplementally driving the turbocharger as through a direct connection to the turbocharger shaft. See U.S. Pat. Nos. 2,968,914; and 3,869,866; and British Pat. No. 488,396. However, these prior art hydraulic turbine systems have included so-called Pelton-type turbine wheels requiring a ventilated chamber for operation. Accordingly, any attempt to operate the Pelton turbine wheels at relatively high rotational speeds results in generation of large quantities of a foamy mixture of air and hydraulic fluid which must be dissipated before recirculation to the turbine wheel or to other system components. This is particularly disadvantageous when the hydraulic fluid is shared with another fluid system, such as an engine lubrication system, in that the foamy mixture does not return rapidly to liquid state, and cannot be used or pumped in foam form for use in the shared fluid system. Moreover, even when free-wheeling with the turbocharger, Pelton-type turbine wheels are not capable of withstanding the high rotational speeds achieved by modern turbochargers. As a result, Pelton-type hydraulic turbine systems have not found commercial application in modern high speed turbocharger environments.

This invention overcomes the problems and disadvantages of the prior art by providing a turbocharger system specially adapted to include a nonventilated hydraulic turbine driven by an hydraulic fluid shared from another hydraulic system for controllably and supplementally driving a turbocharger.

SUMMARY OF THE INVENTION

In accordance with the invention, a turbocharger system comprises a turbocharger having a turbine wheel and a compressor wheel mounted on a common shaft and respectively received within turbine and compressor housings. The turbine and compressor housings are mounted on a center housing including bearings for rotatably supporting the shaft, and lubricant circulation passages for supplying a lubricant such as oil to the bearings. In operation, exhaust gases from a combustion engine rotatably drive the turbine wheel which correspondingly drives the compressor wheel to supply high density charge air to the engine. Conveniently, the engine includes a separate hydraulic system such as a lubrication system including a conventional pump for circulating engine lubricating fluid at relatively low pressure to lubricate engine components. A portion of the fluid from this separate system is used for circulation to the turbocharger shaft bearings.

The engine also drives a relatively high pressure fluid pump for providing a source of relatively high pressure hydraulic fluid. The high pressure fluid is coupled through a control valve for selective coupling to a nozzle in the center housing of the turbocharger. When supplied with high pressure fluid, the nozzle directs the high pressure fluid into driving communication with a nonventilated hydraulic turbine mounted on the turbocharger shaft and disposed within a turbine flow chamber in the center housing. The high pressure fluid thus rotatably drives the nonventilated hydraulic turbine and thereby supplementally drives the turbocharger. Importantly, the passage of fluid through the turbine chamber is controlled so that the nonventilated hydraulic turbine runs fully submerged to prevent frothing or foaming of the fluid. Fluid exiting the turbine chamber is returned to the engine hydraulic system.

In one embodiment of the system of this invention, the control valve couples the high pressure system fluid back to the engine hydraulic system whenever supplemental driving of the turbocharger is not required. In this manner, the high pressure fluid pump is substantially unloaded. In another embodiment of the invention, the high pressure fluid is coupled to drive hydraulically a fan or the like for forcing cooling air across heat transfer surface areas of a charge air heat exchanger when supplemental driving of the turbocharger is not required.

In another embodiment of the invention, the control valve is operable when it is desired to start the engine to couple high pressure hydraulic fluid to rotatably drive the nonventilated hydraulic turbine. This rotatably drives the turbocharger to supply charge air to an auxiliary combustor mounted in-line between the engine and the turbocharger turbine wheel. Fuel is combusted in the combustor along with the charge air to provide high energy exhaust gases for accelerating the turbocharger to a relatively high rotational speed. At this time, the pressure of the turbocharger charge air output is sufficient for quick and easy starting of the engine. The auxiliary combustor is then variably controlled over a wide range of engine operation to supplementally drive the turbocharger as required to maintain engine load-carrying capacity.

BRIEF DESCRIPTION OF THE DRAWINGS

The accompanying drawings illustrate the invention. In such drawings:

FIG. 1 is a schematic diagram illustrating the hydraulic assist turbocharger system of this invention;

FIG. 2 is a fragmented vertical section of a turbocharger including a nonventilated hydraulic assist turbine;

FIG. 3 is a perspective view, partially exploded, of the hydraulic assist turbine and associated hydraulic nozzle;

FIG. 4 is a reduced fragmented viertical section taken on the line 4—4 of FIG. 2;

FIG. 5 is an end view of the hydraulic nozzle taken on the line 5—5 of FIG. 3;

FIG. 6 is a horizontal section taken on the line 6—6 of FIG. 3;

DETAILED DESCRIPTION OF THE PREFERRED EMBODIMENT

Figure 7:
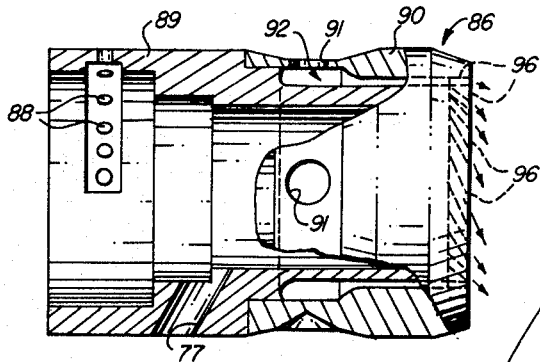
FIG. 7 is an enlarged fragmented vertical section of the hydraulic nozzle of FIG. 3.

An hydraulic assist turbocharger system 10 is shown in FIG. 1, and generally comprises a turbocharger 12 for supplying relatively high density charge air to a combustion engine 14, such as a two-cycle or a four-cycle internal combustion engine. More specifically, the turbocharger 12 includes a turbine wheel 16 and a compressor wheel 18 respectively received within turbine and compressor housings 20 and 22. The turbine and compressor housings 20 and 22 are interconnected by a center housing 24 including bearings 26 such as suitable journal and thrust bearings for rotatably supporting a shaft 28 to which the turbine wheel 16 and the compressor wheel 18 are commonly connected.

The turbocharger turbine wheel 16 is rotatably driven by exhaust gases from the engine 14 which are supplied to the turbine wheel via an exhaust manifold 29 and an exhaust conduit 30. If desired, the turbohcarger turbine housing 20 and the exhaust manifold 29 and conduit 30 may be adapted for divided, pulse-type operation such as that shown and described in U.S. Pat. No. 3,294,364. The rotating turbine wheel 16 rotatably drives the shaft 28 and the compressor wheel 18, whereby the compressor wheel 18 draws in and compresses ambient air. This compressed ambient air comprises charge or boost air for the engine 14, and is supplied to the intake manifold 32 of the engine via a charge air conduit 34. Conveniently, as shown, a charge air cooler heat exchanger 36 may be provided along the conduit 34 to cool the compressed charge air so as to reduce the total heat load of the engine and to further densify the charge air. The relatively high density charge air thus supplied to the engine 14 enables the engine to operate at a relatively high performance and efficiency level.

The engine 14 includes an hydraulic fluid system 38 which is coupled to provide shared hydraulic fluid to the turbocharger for lubrication of the turbocharger bearings 26. In a preferred embodiment of the invention, the engine hydraulic fluid system 38 comprises an engine oil system, although other types of engine-driven hydraulic systems for other purposes are contemplated. As embodied in an engine oil system as shown in FIG. 1, the hydraulic system 38 includes a reservoir 40 of hydraulic fluid or oil within the engine, and a relatively conventional low pressure oil pump 42 for pumping oil from the reservoir 40 to the engine 14 and the turbocharger 12. More specifically, the oil is pumped through an oil filter 44 and an oil cooler 46, and further to engine components requiring lubrication as indicated by conduit 48. The oil is also coupled through a supply conduit 50 to the center housing 24 of the turbocharger 12 for supply to the turbocharger bearings 26 via a network of internal passages (not shown in FIG. 1) formed in the center housing. The oil passes through the bearings 26, typically as by a gravity-drain system as will be hereafter described, and is returned to the engine oil reservoir 40 as by a return conduit 54. Accordingly, the bearings 26 of the turbocharger 12 share the hydraulic system 38 with the engine 14 to assure that the turbocharger bearings 26 are properly lubricated at all times.

The turbocharger system 10 of this invention includes a nonventilated hydraulic turbine 56 for supplementally driving the turbocharger compressor wheel 18 during certain modes of engine operation. That is, during some conditions of engine operation, the engine exhaust gases are incapable of rotatably driving the turbine wheel 16 at a speed sufficient to drive the compressor wheel 18 to supply the engine 14 with sufficient charge air. For example, such engine operating conditions may include relatively low speed, full load conditions wherein the available energy in the exhaust gases is relatively low, or relatively low speed acceleration conditions wherein there is insufficient excess charge air available to accommodate rapid transient operating conditions. To assure that the compressor wheel is sufficiently driven to supply the engine with sufficient quantities of charge air, the turbocharger system includes the nonventilated hydraulic turbine 56 for selectively and controllably supplementally driving the compressor wheel 18.

As illustrated in FIG. 1, the nonventilated hydraulic turbine 56 is mounted within the center housing 24 directly upon the turbocharger shaft 28 between the sets of bearings 26 rotatably supporting the shaft. The nonventilated hydraulic turbine 56 is hydraulically driven by high pressure fluid or oil shared from the engine hydraulic system 38. That is, the hydraulic system 38 includes a high pressure pump 58 which may be suitably driven by the engine 14 to provide a source of high pressure fluid. As shown, the high pressure pump 58 has its intake coupled to the engine hydraulic system 38 conveniently at the discharge side of the low pressure pump 42. The high pressure pump 58 supplies high pressure oil to a high pressure supply conduit 60 coupled directly to a control valve 62 which comprises an hydraulic control valve. The control valve 62 is suitably operated to couple the high pressure oil flow to the hydraulic turbine 56 via a line 64, or alternately to return the output of the high pressure pump 58 to the engine hydraulic system 38 to substantially unload the pump 58. As shown, the output of the high pressure pump 58 is returned to the hydraulic system 38 by means of a bypass return conduit 66 coupled to the bearing supply conduit 50. Conveniently, a one-way relief valve 61 is connected between the high pressure supply conduit 60 and the bearing supply conduit 50 to prevent excessive system oil pressures.

The control valve 62 is controlled in response to operating parameters of the turbocharger system 10 to control the operation of the hydraulic turbine 56. As shown, one control scheme for the control valve 62 comprises connection of the valve 62 with the output or discharge pressure of the turbocharger compressor wheel 18 by means of a pressure control line 68. When compressor discharge pressure is at or above a predetermined minimum threshold, the control valve 62 responds to the pressure to return the output of the high pressure pump 58 to the hydraulic system via the bypass return conduit 66. In this event, sufficient oil back pressure corresponding with the discharge pressure of the low pressure pump 42 is available in the turbocharger bearing supply conduit 50 to maintain a relatively small oil flow, say on the order of about one gallon per minute, to the turbocharger bearings 26 for lubrication purposes. This bearing lubrication oil circulates through the center housing 24 in communication with the bearings 26 and then returns to the engine oil system 38 via the main return conduit 54.

When compressor discharge pressure falls below the predetermined threshold value, the control valve 62, automatically in response to the pressure, shifts position to couple directly the output of the high pressure pump 58 to the nonventilated hydraulic turbine 56. That is, high pressure oil is fed into the high pressure supply line 64 which couples the oil to the center housing 24 for driving supply to the nonventilated hydraulic turbine 56. The high pressure oil rapidly accelerates the nonventilated hydraulic turbine 56 correspondingly to accelerate rapidly the turbocharger shaft 28. In this manner, the compressor wheel 18 is rapidly accelerated to increase substantially the pressure level of the compressor discharge charge air. This effectively provides the engine 14 which additional or supplemental charge air to maintain the engine 14 in a high power load carrying state in spite of the inability of the engine exhaust gases to drive adequately the turbocharger turbine wheel 16.

The high pressure oil is circulated through the nonventilated hydraulic turbine 56 at a relatively high flow rate and pressure, say on the order of up to about twelve gallons per minute and up to about 1600 p.s.i. This high pressure oil is separated within the center housing 24 from direct communication with air to prevent foaming. The high pressure oil is also maintained separate from the bearing circulation path to prevent flooding of the bearings 26, and to allow the high pressure oil to flow into communication with the hydraulic turbine 56 at a relatively high flow rate. As illustrated in FIG. 1, the oil drains from the nonventilated hydraulic turbine 56 through a one-way check valve 70 and a drain conduit 72 to the turbocharger bearing supply conduit 50. With this configuration, the oil flow returning to the engine hydraulic system 38 via the conduit 50 is maintained at a sufficient back pressure to assure a relatively small flow through the bearing oil supply network within the center housing 24 to maintain bearing lubrication. Of course, the check valve 70 prevents bearing supply flow from communicating with the nonventilated hydraulic turbine 56 when the turbine 56 is not supplementally driven by high pressure oil.

The construction of the turbocharger center housing 24 and the mounting of the nonventilated hydraulic turbine 56 therein is shown in detail in FIGS. 2–8. As shown, the turbocharger center housing 24 is secured between the turbine and compressor wheels 16 and 18, respectively, which in turn are carried within the turbine and compressor housings 20 and 22 (not shown in FIG. 2). The wheels 16 and 18 are fixed upon the shaft 28 which is rotatably carried within the center housing 24 by means of a conventional thrust bearing assembly identified in FIG. 2 by reference numeral 74, and a pair of generally opposed and conventional sleeve-type journal bearings 126. The journal bearings 126 are supplied with relatively low pressure lubricating oil by means of an oil inlet port 76 which is coupled to the bearing supply conduit 50 (not shown in FIG. 2). The oil supplied to the port 76 is guided to the bearings via the internal supply passage network 52, and via holes 53 formed in the bearings 126. From there, the oil drains gravitationally through openings 75 to the bearing oil return line 54 (not shown in FIG. 2) via a sump 78.

As shown in FIG. 2, the nonventilated hydraulic turbine 56 is centrally carried on the shaft 28 within an enlarged flow chamber 80. More specifically, the nonventilated hydraulic turbine 56 is positioned in axially abutting relation with a shoulder 82 on the shaft 28, and is retained against axial excursions by a positioning sleeve 84 which is in turn retained in position by a thrust collar of the thrust bearing assembly 74. This sleeve 84 is contained concentrically within the left-hand journal bearing 126, which is in turn concentrically contained within a cylindrical high pressure nozzle 86. Conveniently, the nozzle 86 includes holes 88 registering with the bearing oil holes 53 so as to assure adequate lubrication of the left-hand journal bearing 126 as viewed in FIG. 2, as well as a drain opening 77 registering with the adjacent bearing drain opening 75.

The nozzle 86 has a two-part construction in order to guide high pressure oil into driving communication with the nonventilated hydraulic turbine 56. That is, the nozzle 86 includes an inner portion 89 fixed in position by a set screw 87, and which cooperates at one end with an outer portion 90 fixed thereto as by brazing to define a generally semi-circular chamber 92. The chamber 92 communicates via a plurality of flow openings 91 with a high pressure oil inlet port 94 coupled to the high pressure supply conduit 64 (not shown in FIG. 2) for receiving high pressure oil. The high pressure oil, when supplied to the chamber 92, flows through and out of the chamber 92 via a plurality of generally semi-circularly arranged nozzle openings 96. Importantly, these nozzle openings 96 are oriented in a common angular direction with respect to the axis of the shaft 28 so as to impart a circumferentially turning motion to the nonventilated hydraulic turbine 56. That is, as best shown in FIG. 7, the nozzle openings 96 are angeld at about 75 degrees or so with respect to the axis of the shaft 28 to direct the high pressure oil circumferentially against the turbine 56 to rotatably drive said turbine.

Figure 8:
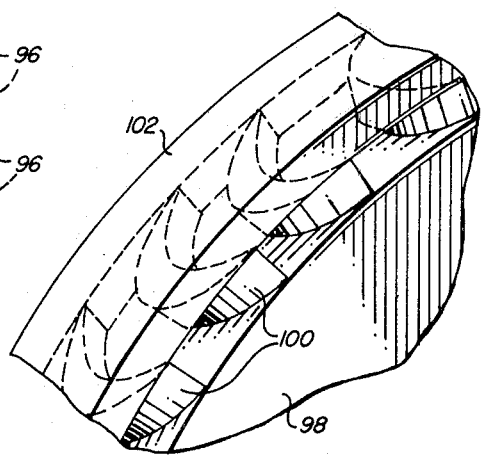
FIG. 8 is an enlarged fragmented perspective view of a portion of the hydraulic turbine

The nonventilated hydraulic turbine 56 comprises a central disk 98 received over the shaft 28, and a plurality of radially outwardly projecting blades 100. These blades 100, as shown in FIGS. 3, 6, and 8, have a generally cup-shaped or U-shaped configuration presented openly toward the angularly directed oil jets passing from the nozzle openings 96. The blades 100 are, of course, arranged and aligned for direct impingement by the oil jets. Desirably, a circumferential shroud 102 is formed integrally about the radially outer ends of the blades 100 to improve driving coaction between the blades 100 and the oil jets.

In operation, high pressure oil supplied to the nozzle 86 is converted to high pressure oil jets for rapidly accelerating the nonventilated hydraulic turbine 56. The oil driving the turbine 56 substantially immediately floods the center housing flow chamber 80 whereby the hydraulic turbine 56 operates in a nonventilated flooded environment to prevent foaming or frothing of the oil. The oil circulates out of the chamber 80 via an outlet port 104 coupled to the bearing oil supply line 50 (FIG. 1). Importantly, the relative sizes of the inlet and outlet ports 94 and 104, together with the back pressure on the chamber 80 resulting from the presence of low pressure oil in conduit 50, assures substantially immediate flooding of the flow chamber 80 when oil is supplied thereto. Air in the flow chamber 80 is forced by the incoming flooding oil outwardly from the chamber 80 in both directions along the shaft 28. That is, the air is forced between the positioning sleeve 84 and the nozzle 86 for escape through the drain openings 75 and 77, and in the other direction past a divider ring 106 secured in position by retaining rings 107 for escape through the other drain opening 75. During supply of high pressure oil to the nonventilated hydraulic turbine 56, some oil may leak from the flow chamber 80 in both directions along the shaft 28. In this regard, the positioning sleeve 84 includes a slinger 73 aligned with the adjacent drain openings 75 and 77 for radially pumping any such leaking oil through said openings 75 and 77 to the sump 78. Similarly, a slinger contour 71 is formed on the shaft 28 adjacent the divider ring 106 and opposite the flow chamber 80. This slinger contour 71 is aligned with the adjacent drain opening 75, and also functions to pump any leaking oil through the adjacent drain opening 75 to the sump 78. Importantly, both the slinger 73 and the slinger contour 71 are positioned inboard with respect to the journal bearings 126 so as to guard against flooding of said bearings.

When high pressure oil flow to the nonventilated hydraulic turbine 56 ceases, the remaining oil in the flow chamber 80 is rapidly pumped out of the chamber to allow the turbine 56 to freewheel with the turbocharger shaft 28 without significant resistance losses. More specifically, the oil remaining in the chamber 80 is pumped out of the chamber in both directions along the shaft 28 toward the journal bearings 126 by the spinning action of the shaft 28 and the nonventilated hydraulic turbine 56. Conveniently, the slinger 73 and the slinger contour 71 described above operate to prevent the pumped oil from contacting or flooding the turbocharger bearings 126. Accordingly, during all conditions of operation, the turbocharger journal bearings 126 and the thrust bearing assembly 74 are lubricated solely by means of oil supplied via the passage network 52, with seal rings 108 being positioned at opposite ends of the shaft 28 to prevent any oil from leaking into either the turbine housing 20 or the compressor housing 22.

Figure 9:
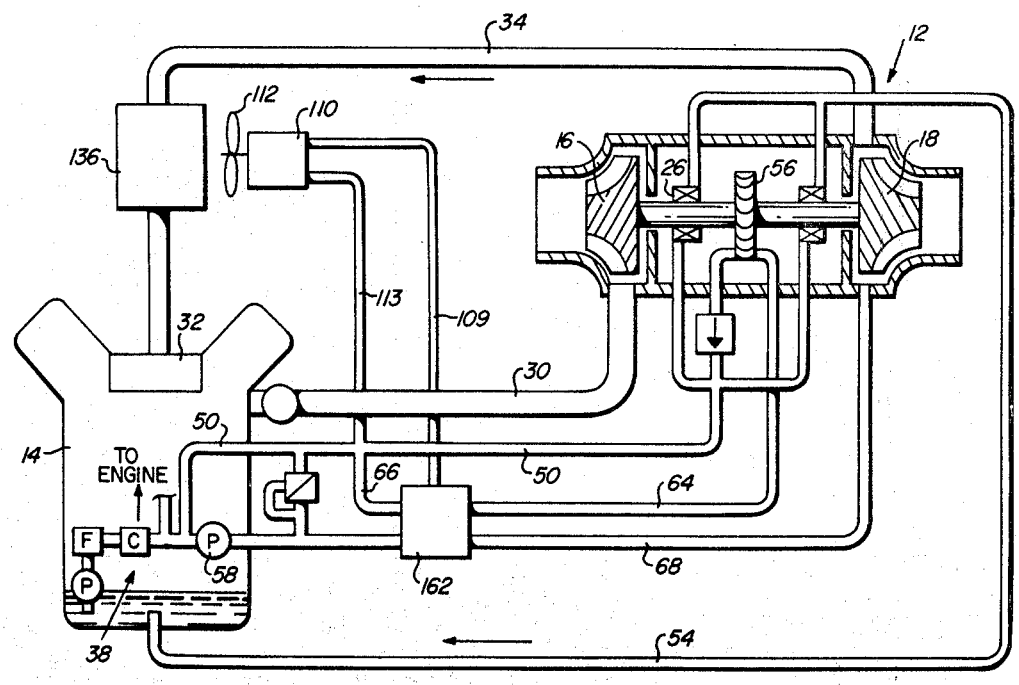
FIG. 9 is a schematic diagram illustrating an alternate arrangement of the invention.

An alternate embodiment of the invention is illustrated schematically in FIG. 9, wherein components identical to those shown and described in FIGS. 1–8 are designated by common reference numberals. In this embodiment, a modified control valve 162 functions optionally to couple the high pressure oil from the high pressure pump 58 through a conduit 109 to an hydraulic motor 110 coupled to drive a fan 112. The high pressure oil thus causes the fan 112 to force large quantities of cooling ambient air across cooling surface areas of a charge air cooler heat exchanger 136, before returning to the bearing supply line 50 via a return conduit 113. With this arrangement, cooling capacity of the charge air heat exchanger 136 is improved over that of the embodiment of FIG. 1 to reduce further the temperature level of the charge air supplied to the engine 14. Conveniently, the need for improved charge air cooling normally arises when large quantities of charge air are supplied to the engine, namely, at relatively high boost levels of turbocharger operation. Therefore, the additional charge air cooling is required primarily when sufficient charge air is available, and is not required when supplemental driving of the turbocharger is needed. Thus, the control valve 162 operates to supply the high pressure oil to the turbocharger 12 under some engine operating conditions for driving the nonventilated hydraulic turbine 56, and to the hydraulic motor 110 for driving the charge air cooling fan 112 during other engine operating conditions.

Figure 10:
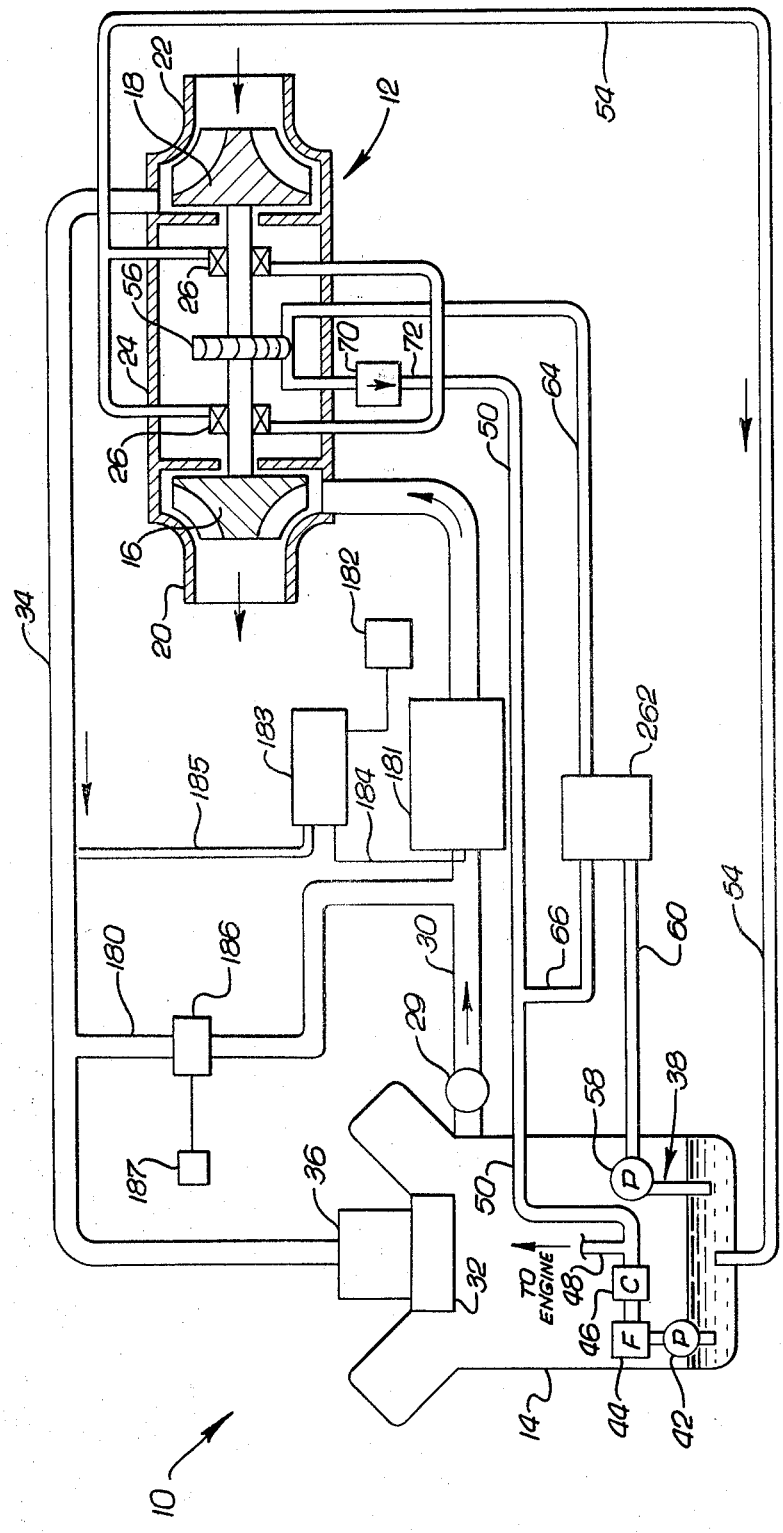
FIG. 10 is schematic diagram illustrating another alternate arrangement of the invention.

Still another embodiment of the invention is illustrated in FIG. 10, with components identical to those shown and described in FIGS. 1–8 being referred to with common reference numerals. In this embodiment, the high pressure pump 58 has its inlet communicating directly with the oil reservoir of the engine hydraulic fluid system 38, and is suitably driven as by electrical means (not shown) or the like for pumping oil at a relatively high pressure through a high pressure supply conduit 60 to a control valve 262. The control valve 262 is suitably operated to couple the high pressure oil flow to the nonventilated hydraulic turbine 56 via a line 64, or alternately, to return the output of the high pressure pump 58 to the engine hydraulic system 38 via the bearing supply conduit 50 to substantially unload the pump 58.

The control valve 262 in this embodiment is controlled for supplying high pressure oil to the nonventilated hydraulic turbine 56 whenever it is desired to start the combustion engine 14. That is, for starting of the engine 14, the control valve 262 couples the high pressure oil to the hydraulic turbine 56 to initiate rotation of the turbine 56, and the turbocharger turbine wheel 16 and compressor wheel 18. If desired, the control valve 262 may include means for simultaneously initiating operation of the high pressure pump 58. Alternately, high pressure oil for starting purposes may be obtained from a high pressure oil accumulator.

The hydraulically driven turbocharger 12 supplies compressed air, or charge air, from the compressor wheel 18 to the charge air conduit 34 for supply of charge air to the intake manifold 32 of the engine 14. However, prior to starting of the engine 14, flow of the charge air through the engine for combustion purposes is not possible. In this pre-starting condition, the charge air is supplied through a bypass conduit 180 directly to the engine exhaust conduit 30 upstream of the turbocharger turbine wheel 16. This bypass charge air is further supplied to an auxiliary combustor 181 mounted in-line along the exhaust conduit 30. The auxiliary combustor 181 is supplied with fuel from a fuel supply 182 through a scheduling fuel control 183 via a fuel line 184. The fuel and the bypass charge air are ignited within the combustor 181 by suitable ignition means (not shown) to yield a substantial and continuous combustor flame for supplying substantial high energy exhaust gases for rotatably driving the turbine wheel 16 of the turbocharger 12. Importantly, while the specific construction details of the combustor 181 and fuel injector means therefor, and the fuel control 183 are not shown or described in detail herein, components generally as described and shown in U.S. Pat. No. 4,215,549 are preferred.

In operation, the auxiliary combustor 181 is supplied with fuel appropriately to accelerate the turbine wheel 16 to a substantial rotational speed. This correspondingly accelerates the compressor wheel 18 to a relatively high rotational speed for supply of a substantial quantity of charge air to the auxiliary combustor 181 for combustion. As soon as a desired minimum charge air pressure level is reached, the engine 14 may be started. Starting of the engine ingests a portion of the charge air for ignition with fuel to provide exhaust gases for passage through the exhaust conduit 30 and the combustor 181 for rotatably driving the turbine wheel 16.

As can be seen, the hydraulically driven turbine wheel 56 together with the auxiliary combustor 181 provide means for making available charge air at sufficient quantity and pressure for starting the engine 14. This system is particularly suited for use with a low compression engine wherein charge air at elevated pressure is a prerequisite for the engine to reach self-sustaining operation upon starting. The high pressure control valve 262 is operated to cease supply of high pressure oil to the hydraulic turbine 56 as soon as the auxiliary combustor 181 accelerates the turbocharger turbine wheel 16 to a speed sufficient to supply the combustor 181 with sufficient charge air for self-sustained operation. If desired, the high pressure oil is then available for driving an hydraulic motor 110 (FIG. 9) for operating a fan 112 for use in cooling the charge air in a charge air heat exchanger. However, this arrangement is not specifically included in FIG. 10 for purposes of clarity.

Once the engine 14 is started, the auxiliary combustor 181 may be shut down by virtue of discontinuing fuel supply thereto, whereupon the engine 14 will operate as a conventional turbocharged engine with exhaust gases therefrom flowing freely through the combustor. However, if desired, the auxiliary combustor 181 may be suitably controlled to supplementally drive the turbocharger 12 at relatively low speed engine operating conditions to maintain the engine in a relatively high load-carrying state. That is, the fuel control 183 may be suitably scheduled in accordance with engine operating conditions as by a charge air pressure conduit 185 coupled to the charge air supply conduit 34. The fuel control 183 responds to this parameter to provide a relatively high fuel flow to the combustor 181 at relatively low engine speed, and to reduce progressively the fuel flow with increases in engine speed to supplement the energy level of gases supplied to the turbine wheel 16 in accordance with engine load-carrying requirements. As stated above, a preferred fuel control construction is shown and described in detail in U.S. Pat. No. 4,215,549.

The bypass conduit 180 includes bypass valve means 186 comprising a check valve for preventing reverse flow from the exhaust conduit 30 to the charge air supply conduit 34. The bypass valve means 186 also includes a closure valve for selectively closing the bypass conduit 180 to charge air flow. This closure valve is opened by a suitable valve operator 187 for supply of charge air to the combustor 181 for initiation of combustor combustion. The closure valve is also retained open throughout relatively low speed engine operation to allow a portion of the charge air to bypass to the combustor 181 for use in supplementing the energy level of gases supplied to the turbocharger. However, at relatively high engine speed, the closure valve is closed to prevent bypass of charge air to the combustor 181 whereby all of the air is supplied to the engine. Importantly, at high engine speed, supplemental driving of the turbocharger is not required, and the oxygen content of engine exhaust gases is sufficient to maintain, when desired, a pilot flame in the combustor 181.

The valve operator 187 may be manually controlled, or may be automatically controlled in response to engine operating parameters such as charge air pressure, etc. Alternately, if desired, the valve operator 187 and the closure valve may be omitted by appropriately sizing the turbocharger 12 to match engine air flow consumption requirements. That is, the volumetric intake requirements of the engine are proportional to engine speed. With a turbocharger designed generally to match engine air intake flow requirements at relatively high engine speed, bypass air becomes unavailable for bypass flow directly to the combustor 181 at relatively high engine speed by virtue of the engine ingesting all of the supplied charge air. However, at lower engine speeds, the engine fails to ingest or require the total volume of supplied charge air flow, whereby an excess portion of the charge air flow becomes available for bypass to the combustor 181. Importantly, the combustion system using either the closure valve or requiring a matching of the turbocharger to engine air flow requirements is discussed in more detail in U.S. Pat. No. 4,215,549 referred to above.

Various modifications and improvements to the invention set forth herein are believed to be possible within the scope of the art. For example, a variety of control schemes for the control valves 62 and 162 are possible, including electronic systems and the like responsive to one or more engine and/or turbocharger operating parameters. Moreover, the invention is adaptable for use with conventional four-cycle internal combustion engines, or with two-cycle internal combustion engines. With two-cycle engines, the control scheme for the control valves 62 and 162 may be designed so as to supplementally drive the turbocharger in a manner allowing elimination of the conventional scavenging blower. Further, in the embodiment of FIG. 9, the control valve 162 may be adapted also to couple the high pressure oil directly to the bearing supply conduit 50 via the line 66, whereby the control valve 162 is capable of three-position operation to effect (a) driving of the non-ventilated hydraulic turbine 56 (b) driving of the fan 112, or (c) unloading of the high pressure oil pump 58. Still further, the nozzle 86 shown particularly in FIGS. 2–7 may be modified to include circumferentially arranged nozzle openings 96. These nozzle openings 96 may be divided into groups for association with two or more chambers 92 which may in turn be coupled to separately controlled, multiple high pressure fluid supply conduits. Accordingly, no limitation of the invention is intended by way of the description herein except as set forth in the appended claims.

What is claimed is:

1. A turbocharger system for supplying charge air to a combustion engine, comprising a turbocharger including a turbine rotatably driven by engine exhaust gases, and a compressor rotatably driven by said turbine for supplying charge air to said engine; an engine hydraulic system including means for supplying hydraulic fluid to said turbocharger for lubrication thereof; an hydraulic turbine coupled directly to said turbocharger; means for selectively supplying a portion of the fluid from said hydraulic system to said hydraulic turbine at a relatively high pressure for rotatably driving said hydraulic turbine fully submerged; a combustor coupled between the engine and the turbocharger for passage of engine exhaust gases; fuel supply means for controllably supplying fuel to the combustor generally in inverse proportion to engine speed; and means for selectively and intermittently bypassing a portion of the turbocharger charge air flow around the engine to the combustor in response to engine operating conditions.

2. A turbocharger system as set forth in claim 1 wherein said means for supplying fluid to said hydraulic turbine comprises a relatively high pressure pump for pumping fluid from said hydraulic system, supply conduit means coupled to said high pressure pump for supplying the pumped fluid into driving communication with said hydraulic turbine, and valve means coupled along said supply conduit means for selectively opening and closing said supply conduit means to fluid flow.

3. A turbocharger system as set forth in claim 2 wherein said valve means is operable for selectively opening said supply conduit means for supplying charge air flow to said combustor prior to starting of the engine, and for closing said supply conduit means when said combustor and said turbocharger reach self-sustaining operation.

4. A turbocharger system as set forth in claim 3 including a charge air heat exchanger coupled between said compressor and the engine for cooling passage of the charge air prior to supply thereof of the engine.

5. A turbocharger system as set forth in claim 4 including a fan for forcing ambient air through said heat exchanger in heat exchange relation with the charge air passing through said heat exchanger, and an hydraulic motor for rotatably driving said fan; said valve means being coupled to said hydraulic motor for selectively circulating relatively high pressure fluid therethrough for driving said motor, and selectively operable to couple the high pressure fluid to one of said hydraulic turbine, and said hydraulic motor.

6. A turbocharger system as set forth in claim 1 wherein said hydraulic system comprises an oil reservoir; a relatively low pressure pump for pumping oil from said reservoir; first means for circulating low pressure oil from said low pressure pump to the engine for lubrication thereof, and to return the oil to said reservoir; and second means for circulating low pressure oil from said low pressure pump to the turbocharger for lubrication thereof, and to return the oil to said reservoir; and wherein said high pressure lubricant supply means comprises a relatively high pressure pump for pumping oil from said hydraulic system at a relatively high pressure, a supply conduit coupled between said high pressure pump and said hydraulic turbine for supplying high pressure oil into driving communication with said hydraulic turbine, valve means for selectively opening and closing said supply conduit to oil flow, and a return conduit coupled between said hydraulic turbine and said second means.

7. A turbocharger system as set forth in claim 1 wherein said turbocharger comprises said turbine having a turbine wheel carried within a turbine housing, said compressor having a compressor wheel carried within a compressor housing, a common shaft connected between said turbine and compressor wheels, and a center housing connected between said turbine and compressor housings and including bearing means for rotatably supporting said shaft, said hydraulic system including a bearing supply conduit for supplying relatively low pressure fluid for lubrication of said bearing means, and a bearing return conduit for returning the low pressure fluid from said bearing means to said hydraulic system.

8. A turbocharger system as set forth in claim 7 wherein said center housing includes a turbine flow chamber, said hydraulic turbine being mounted on said shaft within said flow chamber, and nozzle means for directing high pressure fluid into driving communication with said hydraulic turbine.

9. A turbocharger system as set forth in claim 8 wherein said nozzle means comprises a generally cylindrical member carried about said shaft, said cylindrical member including a nozzle chamber for receiving high pressure fluid, and a plurality of relatively small nozzle openings communicating between said nozzle chamber and said hydraulic turbine whereby the high pressure fluid is directed as high pressure jets through said nozzle openings into driving communication with said hydraulic turbine.

10. A turbocharger system as set forth in claim 8 wherein said means for supplying fluid to said hydraulic turbine comprises a relatively high pressure pump for pumping fluid from said hydraulic system, and supply conduit means for supplying the high pressure pumped fluid to said hydraulic turbine, said center housing including an inlet port and an outlet port communicating with said turbine flow chamber for passage of high pressure lubricant therethrough, said inlet port being coupled to said supply conduit means and said outlet port being coupled to said bearing supply conduit so as to apply a back pressure to said flow chamber to cause substantially immediate flooding of said flow chamber with fluid when high pressure fluid is supplied to drive said hydraulic turbine, whereby said hydraulic turbine operates in a nonventilated environment.

11. A turbocharger system as set forth in claim 10 including means on said shaft for pumping air from said flow chamber when high pressure fluid is supplied thereto, and for pumping the fluid from said flow chamber when supply of the fluid to said flow chamber ceases.

12. A turbocharger system as set forth in claim 1 wherein said bypass means includes a bypass conduit and a bypass valve for opening and closing said bypass conduit to charge air flow, said valve being responsive to engine operating conditions to close for at least some conditions of engine operation.

13. A turbocharger system as set forth in claim 1 wherein said turbocharger is sized to provide charge air flow generally matching engine air flow consumption requirements at relatively high speed engine operation whereby the charge air for bypassing through said bypass means is unavailable due to engine consumption when the engine is operated at relatively high speed, said bypass means including a check valve for preventing flow of exhaust gases therethrough.

14. A turbocharger system for supplying charge air to a combustion engine, comprising a turbocharger including a turbine wheel rotatably driven by engine exhaust gases, a compressor wheel mounted on a shaft common with said turbine wheel and rotatably driven thereby for supplying charge air to the engine, and bearing means mounted within a turbocharger center housing for rotatably supporting said shaft; an hydraulic system including a relatively low pressure pump and first conduit means for circulating a lubricant fluid at relatively low pressure to said bearing means for lubrication thereof; an hydraulic turbine mounted on said shaft and disposed within a turbine flow chamber formed in said center housing; means including a relatively high pressure pump and second conduit means for circulating a portion of the fluid at relatively high pressure from said hydraulic system to said hydraulic turbine for rotatably driving said hydraulic turbine fully submerged prior to starting of the engine; a combustor coupled in-line between the engine and the turbocharger for passage of engine exhaust gases; fuel supply means for supplying fuel to the combustor generally in inverse proportion to engine speed; and means for selectively and intermittently bypassing a portion of the turbocharger charger air flow around the engine to the combustor in response to engine operating conditions, said means for circulating the fluid to said hydraulic turbine including means for ceasing circulation of the fluid to said hydraulic turbine when said combustor and said turbocharger reach self-sustaining operation.

15. A turbocharger system as set forth in claim 14 wherein said bypass means includes a bypass conduit and a bypass valve for opening and closing said bypass conduit to charge air flow, said valve being responsive to engine operating conditions to close for at least some conditions of engine operation.

16. A turbocharger system as set forth in claim 14 wherein said turbocharger is sized to provide charge air flow generally matching engine air flow consumption requirements at relatively high speed engine operation whereby the charge air for bypassing through said bypass means is unavailable due to engine consumption when the engine is operated at relatively high speed, said bypass means including a check valve for preventing flow of exhaust gases therethrough.

17. A turbocharger system as set forth in claim 14 including a charge air heat exchanger coupled between said compressor and the engine for cooling passage of the charge air prior to supply thereof to the engine, and a fan for forcing ambient air through said heat exchanger in heat exchange relation with the charge air passing through the heat exchanger, said means for circulating the fluid to said hydraulic turbine including means for rotatably driving said fan after said combustor and said turbocharger reach self-sustaining operation.

18. A turbocharger system as set forth in claim 14 including means on said shaft for pumping air from said flow chamber when high pressure fluid is supplied thereto, and for pumping fluid from said flow chamber when supply of fluid thereto ceases.

19. A turbocharger system for supplying charge air to a combustion engine, comprising a turbocharger including a turbine wheel rotatably driven by engine exhaust gases, a compressor wheel mounted on a shaft common with said turbine wheel and rotatably driven thereby for supplying charge air to the engine, and bearing means mounted within a turbocharger center housing for rotatably supporting said shaft; an hydraulic system for circulating lubricant fluid at relatively low pressure to the engine and said bearing means for lubrication thereof; an hydraulic turbine mounted on said shaft and disposed within a turbine flow chamber formed in said center housing; a relatively high pressure pump for pumping fluid at relatively high pressure from said hydraulic system to said hydraulic turbine for rotatably driving said hydraulic turbine prior to starting of the engine; means to fully submerge the hydraulic turbine during operation thereof; a combustor coupled in-line between the engine and the turbocharger for passage of engine exhaust gases; fuel supply means for supplying fuel to the combustor generally in inverse proportion to engine speed and upon rotatable driving of said hydraulic turbine; bypass means for selectively and intermittently bypassing a portion of the turbocharger charge air flow around the engine to the combustor in response to engine operating conditions, said bypass means including a bypass conduit and a bypass valve for opening said bypass conduit to charge air flow prior to starting of the engine and at relatively low engine speed operating conditions, and for closing said bypass conduit at relatively high engine speed; and means for ceasing pumping of the fluid to said hydraulic turbine when said combustor and turbocharger reach self-sustaining operation.

20. A turbocharger system for supplying charge air to a combustion engine comprising a turbocharger including a turbine wheel rotatably driven by engine exhaust gases, a compressor wheel mounted on a shaft common with said turbine wheel and rotatably driven thereby for supplying charge air to the engine, and bearing means mounted within a turbocharger center housing for rotatably supporting said shaft, said turbocharger being sized to match generally engine air flow consumption requirements at relatively high speed engine operation; an hydraulic system for circulating lubricant fluid at relatively low pressure to the engine and said bearing means for lubrication thereof; an hydraulic turbine mounted on said shaft and disposed within a turbine flow chamber formed in said center housing; a relatively high pressure pump for pumping fluid at relatively high pressure from said hydraulic system to said hydraulic turbine for rotatably driving said hydraulic turbine prior to starting of the engine; means to fully submerge the hydraulic turbine during operation thereof; a combustor coupled in-line between the engine and the turbocharger for passage of engine exhaust gases; fuel supply means for supplying fuel to the combustor generally in inverse proportion to engine speed and upon rotatable driving of said hydraulic turbine; bypass means for bypassing any turbocharger charge air flow in excess of that required by the engine around the engine to said combustor, said excess turbocharger charge air flow being available upon rotation of said hydraulic turbine prior to starting of the engine and during relatively low speed engine operation, and unavailable at relatively high speed engine operation; and means ceasing pumping of the fluid to said hydraulic turbine when said combustor and turbocharger reach self-sustaining operation.

21. In a turbocharger system including a turbocharger having an exhaust gas driven turbine for rotatable driving a compressor for supplying charge air to a combustion engine, and an hydraulic system including means for supplying hydraulic fluid at relatively low pressure to the turbocharger for lubrication thereof, a method of supplementally driving the turbocharger comprising the steps of mounting an hydraulic turbine directly on the turbocharger; selectively supplying a portion of the fluid at a relatively high pressure from the hydraulic system to the hydraulic turbine prior to starting of the engine for rotatably driving the hydraulic turbine fully submerged and thereby drive the compressor for providing a charge air output; coupling the charge air output to a combustor coupled in-line between the engine and the turbocharger for passage of engine exhaust gases; supplying fuel to the combustor for combustion of the fuel with the charge air output for producing high energy exhaust gases; coupling the high energy exhaust gases to the turbocharger turbine for accelerating the turbine and the combustor to self-sustaining operation; starting the engine; and controllably and intermittently bypassing a portion of the turbocharger charge air flow around the engine to the combustor at relatively low speed engine operating conditions for supplementation of the energy level of gases flowing through the combustor.

22. The method of claim 21 wherein said step of supplying fluid to the hydraulic turbine comprises pumping the fluid from the hydraulic system with a relatively high pressure pump, coupling the high pressure fluid into driving communication with the hydraulic turbine via supply conduit means, and selectively opening and closing the supply conduit means with valve means.

23. The method of claim 21 wherein the turbocharger includes a center housing with bearing means for rotatably supporting a shaft commonly connected to said turbine and compressor, said mounting step including mounting the hydraulic turbine on the shaft within a turbine flow chamber formed in the center housing.

24. The method of claim 23 including mounting nozzle means within the center housing, and directing high pressure fluid flow through the nozzle means into driving communication with the hydraulic turbine.

25. The method of claim 23 wherein said hydraulic turbine is submerged by applying a predetermined back pressure to the turbine flow chamber so that the flow chamber substantially immediately floods upon supply of high pressure fluid thereto.

26. The method of claim 25 including pumping with pumping means on the shaft air from the flow chamber when high pressure fluid is supplied thereto, and pumping with said pumping means fluid from the flow chamber when supply of high pressure fluid thereto ceases.

27. The method of claim 21 wherein said bypassing step comprises controlling bypass charge air flow with a bypass valve, and closing said bypass valve at relatively high speed engine operating conditions.

28. The method of claim 21 wherein said bypassing step comprises sizing the turbocharger generally to match engine charge air flow consumption requirements at relatively high speed engine operation whereby bypass in flow is unavailable at said high operating speed.

29. The method of claim 21 including ceasing supply of the high pressure fluid from the hydraulic system to the hydraulic turbine when the combustor and turbocharger reach self-sustaining operation, and thereafter coupling the supply of the high pressure fluid for drivingly operating a fan for forcing ambient air across a charge air heat exchanger in cooling heat exchange relation with charge air prior to supply of the charge air to the engine.

30. In a turbocharger system including a turbocharger having an exhaust gas driven turbine for rotatably driving a compressor for supplying charge air to a combustion engine, and an hydraulic system including means for supplying hydraulic fluid at relatively low pressure to the turbocharger for lubrication thereof, a method of supplementally driving the turbocharger compressor comprising the steps of mounting an hydraulic turbine directly on the turbocharger; selectively supplying a portion of the fluid at a relatively high pressure from the hydraulic system to the hydraulic turbine prior to starting of the engine for rotatably driving the hydraulic turbine fully submerged and thereby drive the compressor for providing a charge air output; coupling the charge air output to a combustor coupled in-line between the engine and the turbocharger for passage of engine exhaust gases; supplying fuel to the combustor for combustion of the fuel with the charge air output for producing high energy exhaust gases; coupling the high energy exhaust gases to the turbocharger turbine for accelerating the turbine and the combustor to self-sustaining operation; starting the engine; and controllably and intermittently bypassing a portion of the turbocharger charge air flow around the engine to the combustor with a bypass conduit and a bypass valve for opening the conduit to charge air flow prior to engine starting and at relatively low engine speed, and for closing the conduit to charge air flow at relatively high engine speed.

31. In a turbocharger system including a turbocharger having an exhaust gas driven turbine for rotatably driving a compressor for supplying charge air to a combustion engine, and an hydraulic system including means for supplying hydraulic fluid at relatively low pressure to the turbocharger for lubrication thereof, a method of supplementally driving the turbocharger compressor comprising the steps of mounting an hydraulic turbine directly on the turbocharger; selectively supplying a portion of the fluid at a relatively high pressure from the hydraulic system to the hydraulic turbine prior to starting of the engine for rotatably driving the hydraulic turbine fully submerged and thereby drive the compressor for providing a charge air output; coupling the charge air output to a combustor coupled in-line between the engine and the turbocharger for passage of engine exhaust gases; supplying fuel to the combustor for combustion of the fuel with the charge air output for producing high energy exhaust gases;

45 coupling the high energy exhaust gases to the turbocharger turbine for accelerating the turbine and the combustor to self-sustaining operation; starting the engine; and controllably and intermittently bypassing a portion of the turbocharger charge air flow around the engine to the combustor by sizing the turbocharger generally to match engine air flow consumption requirements whereby bypass charge air flow in excess of that required by the engine is available for bypass to the combustor prior to starting of the engine and at relatively low speed engine operation, and is unavailable at relatively high speed engine operation.

* * * * *

UNITED STATES PATENT AND TRADEMARK OFFICE
CERTIFICATE OF CORRECTION

PATENT NO. : 4,322,949

DATED : April 6, 1982

INVENTOR(S) : Joe L. Byrne et al

It is certified that error appears in the above-identified patent and that said Letters Patent are hereby corrected as shown below:

Column 15, line 17, before "ceasing" insert --for--;

Column 17, line 5, delete -- , 45--.

Signed and Sealed this

Twenty-second Day of June 1982

[SEAL]

Attest:

GERALD J. MOSSINGHOFF

Attesting Officer       Commissioner of Patents and Trademarks